(12) United States Patent
Fukuda et al.

(10) Patent No.: US 7,469,590 B2
(45) Date of Patent: Dec. 30, 2008

(54) PACKAGE STRUCTURE OF PRESSURE SENSOR

(75) Inventors: Tetsuya Fukuda, Niigata-ken (JP); Mitsuru Watanabe, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/870,791

(22) Filed: Oct. 11, 2007

(65) Prior Publication Data

US 2008/0087095 A1   Apr. 17, 2008

(30) Foreign Application Priority Data

Oct. 17, 2006   (JP) .............................. 2006-282127

(51) Int. Cl.
*G01L 9/12*   (2006.01)
(52) U.S. Cl. .............................. 73/718; 73/724; 438/50
(58) Field of Classification Search .................... 73/724, 73/718; 438/50
See application file for complete search history.

(56) References Cited

U.S. PATENT DOCUMENTS

| 2003/0056598 | A1* | 3/2003 | Kimura et al. ................. 73/754 |
| 2006/0001128 | A1* | 1/2006 | Tamura et al. ............... 257/644 |
| 2007/0095147 | A1* | 5/2007 | Kikuiri et al. ................. 73/724 |
| 2007/0205474 | A1* | 9/2007 | Fukuda et al. .............. 257/414 |
| 2007/0264742 | A1* | 11/2007 | Tamura et al. ................. 438/50 |

FOREIGN PATENT DOCUMENTS

JP   09-101220   4/1997

\* cited by examiner

*Primary Examiner*—Andre J Allen
(74) *Attorney, Agent, or Firm*—Brinks Hofer Gilson & Lione

(57) ABSTRACT

A pressure-sensor package mainly includes a pressure sensor, a support substrate, and a resin layer. The pressure sensor includes a glass substrate having a fixed electrode, and a silicon substrate having a diaphragm that is disposed apart from the fixed electrode by a predetermined distance. The support substrate is a silicon/glass composite substrate on which the pressure sensor is mounted such that the support substrate and the diaphragm face each other. The resin layer fixes the pressure sensor and the support substrate together. The pressure sensor is mounted on a mounting area of the support substrate with a joint member therebetween. Accordingly, even if a gap between the support substrate and the diaphragm has a size of about several micrometers, the pressure-sensor package is capable of performing pressure detection with high sensitivity.

2 Claims, 4 Drawing Sheets

PACKAGE STRUCTURE OF PRESSURE SENSOR

CLAIM OF PRIORITY

This application claims benefit of the Japanese Patent Application No. 2006-282127 filed on Oct. 17, 2006, which is hereby incorporated by reference.

BACKGROUND

1. Field of the Invention

The present invention relates to packages for housing pressure sensors, such as capacitive pressure sensors.

2. Description of the Related Art

In recent years, capacitive pressure sensors and piezoelectric pressure sensors have been developed, and these sensors are installed in devices of various types. When a sensor of such types is to be installed in a device, the sensor is usually packaged within a package, such as a ceramic package, before it is installed in the device.

Japanese Unexamined Patent Application Publication No. 9-101220 discloses an example of a pressure sensor packaged within a package. Specifically, when a pressure sensor is to be packaged within a package, an adhesive (die bonding agent) is applied entirely over the bottom surface of the package, and the pressure sensor is placed on the adhesive so that the pressure sensor is bonded (die-bonded) to the bottom surface of the package with the adhesive.

With the above-described installation technique, however, there are cases where a difference in thermal expansion coefficient between the material constituting the sensor and the material constituting the package has an effect on the sensor characteristics. For example, in a case where the sensor is composed of silicon and the package is composed of alumina, the thermal expansion coefficient of silicon is about 3 to $3.5 \times 10^{-6}$/K, whereas the thermal expansion coefficient of alumina is about $8 \times 10^{-6}$/K. Therefore, since the thermal expansion coefficient of the package is greater, the sensor may be adversely affected by thermal expansion of the package, leading to deterioration in the temperature characteristics of the sensor. In particular, in a pressure sensor in which a gap between a substrate and a diaphragm has a size of about several micrometers, the thermal expansion can cause the diaphragm to become deformed. In that case, the sensor becomes incapable of performing accurate pressure detection.

SUMMARY

A pressure-sensor package is disclosed that includes a pressure sensor including a glass substrate and a silicon substrate. The glass substrate has a silicon conductive member embedded therein and also has a fixed electrode. The silicon substrate has a movable electrode that is disposed apart from the fixed electrode by a predetermined distance. The pressure-sensor includes a support substrate made of a silicon/glass composite. The support substrate has the pressure sensor mounted thereon such that the support substrate and the movable electrode face each other.

Accordingly, since the pressure sensor has a silicon/glass composite structure and the support substrate is a silicon/glass composite substrate, the thermal expansion coefficient of the pressure sensor and the thermal expansion coefficient of the support substrate are extremely similar values. This prevents deterioration of temperature characteristics of the pressure sensor in response to thermal expansion of the package. Accordingly, in a pressure sensor in which a gap between a substrate and a diaphragm has a size of about several micrometers, the diaphragm is prevented from being deformed due to thermal expansion, whereby the pressure sensor can accurately perform pressure detection.

In addition, since the difference in thermal expansion coefficient between the pressure sensor and the support substrate is extremely small, there is no limit to a joint member used for mounting the pressure sensor onto the support substrate. This significantly increases the options for the bonding techniques.

Preferably, the pressure-sensor package further includes a resin layer that fixes the pressure sensor and the support substrate together.

According to the disclosed pressure-sensor package, pressure detection can be performed with high sensitivity even if a gap between a substrate and a diaphragm has a size of about several micrometers.

DESCRIPTION OF THE EMBODIMENTS

An embodiment of the present invention will now be described with reference to the drawings.

Figure 1:
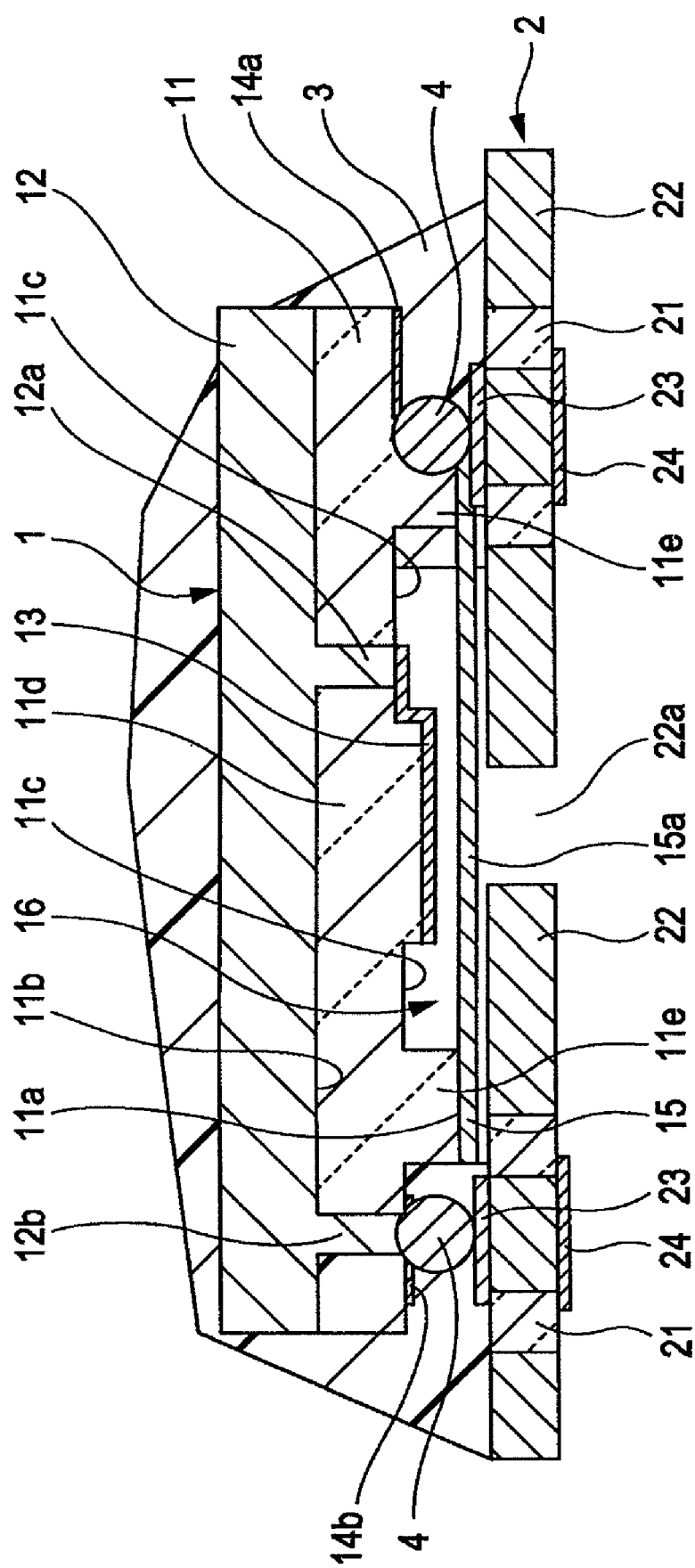
FIG. 1 is a cross-sectional view of a pressure-sensor package according to an embodiment.

FIG. 1 is a cross-sectional view of a pressure-sensor package according to an embodiment.

The pressure-sensor package shown in FIG. 1 mainly includes a pressure sensor 1, a support substrate 2, and a resin layer 3. The pressure sensor 1 includes a glass substrate having a fixed electrode, and a silicon substrate having a movable electrode that is disposed apart from the fixed electrode by a predetermined distance. The support substrate 2 has a mounting area on which the pressure sensor 1 is mounted such that the support substrate 2 and the movable electrode face each other. The resin layer 3 fixes the pressure sensor 1 and the support substrate 2 together. The pressure sensor 1 is mounted on the mounting area of the support substrate 2 with joint members 4 there between.

The pressure sensor 1 has silicon conductive members embedded therein, and is constituted by the glass substrate having the fixed electrode and by the silicon substrate having the movable electrode disposed apart from the fixed electrode by a predetermined distance. In detail, the pressure sensor 1 has the following structure.

In FIG. 1, the glass substrate is indicated by reference numeral 11. The glass substrate 11 has a pair of opposite principal surfaces 11a and 11b. The glass substrate 11 has silicon members 12a and 12b embedded therein. These silicon members 12a and 12b protrude from a silicon substrate 12. The silicon members 12a and 12b are exposed at the principal surface 11a of the glass substrate 11.

The principal surface 11a of the glass substrate 11 has a recess 11c for providing a space between the fixed electrode and the movable electrode. Within the recess 11c is provided a projection 11d in a region where the fixed electrode is located. In other words, the fixed electrode, indicated by reference numeral 13, is provided on this projection 11d. The fixed electrode 13 also extends to an area in the recess 11c where the silicon member 12a is exposed. Consequently, the fixed electrode 13 and the silicon member 12a are electrically connected to each other.

The principal surface 11a of the glass substrate 11 has bonding areas 11e outside the recess 11c. A silicon substrate 15 having a diaphragm 15a, serving as the movable electrode, is bonded to these bonding areas 11e. The glass substrate 11 and the silicon substrate 15 are bonded to each other and form a cavity 16 there between. The fixed electrode 13 is located within this cavity 16.

In areas of the glass substrate 11 outside the cavity 16 are provided electrodes 14a and 14b. The electrodes 14a and 14b are electrically connected to the joint members 4. The electrode 14b is disposed over the exposed section of the silicon member 12b. Consequently, the electrode 14b and the silicon member 12b are electrically connected to each other.

The interface between the glass substrate 11 and the silicon substrate 15 preferably has high adhesion. For this reason, the glass substrate 11 and the silicon substrate 15 are generally joined to each other by means of anode coupling. Anode coupling is a process in which a large electrostatic attraction is generated at the interface between silicon and glass by applying a predetermined voltage of, for example, 300 V to 1 kV to the interface at a predetermined temperature of, for example, 400° or lower so as to form a covalent bond at the interface. In this case, the covalent bond at the interface is a Si—Si bond formed between silicon atoms contained in silicon and silicon atoms contained in glass, or a Si—O bond. With the Si—Si bond or the Si—O bond, the silicon and the glass are tightly bonded to each other, thereby exhibiting extremely high adhesion at the interface therebetween. In order to implement such an anode coupling efficiently, the glass substrate 11 is preferably composed of a glass material that contains alkali metal, such as sodium (for example, Pyrex® glass). This allows the airtightness in the cavity 16 formed between the diaphragm 15a and the glass substrate 11 to be maintained at a high level. In addition, since it is also preferable that the interfaces between the glass substrate 11 and the silicon members 12a and 12b have a high adhesion, the glass substrate 11 and the silicon members 12a and 12b are also preferably joined to each other by anode coupling.

The support substrate 2 on which the pressure sensor 1 is mounted is a silicon/glass composite substrate. Specifically, the support substrate 2 is constituted by glass substrates 21 having silicon members 22 embedded therein. Each of the silicon members 22 is exposed at opposite principal surfaces of the corresponding glass substrate 21, and is electrically connected to electrodes 23 and 24 at the respective opposite principal surfaces.

The silicon members 22 have an opening 22a therebetween. The opening 22a can function as an air-release path for releasing air when air enters inside in the course of formation of the resin layer 3.

As a material for the resin layer 3, for example, ultraviolet curable resin may be used. The resin layer 3 enhances the bonding strength between the pressure sensor 1 and the support substrate 2.

The electrodes 23 of the support substrate 2 define the mounting area on which the pressure sensor 1 is mounted. The electrodes 23 have the pressure sensor 1 mounted thereon with the joint members 4 therebetween. Specifically, the pressure sensor 1 is mounted in a manner such that the diaphragm 15a faces the support substrate 2 (or such that the diaphragm 15a is located at the lower side and the silicon substrate 12 is located at the upper side). Examples of the joint members 4 used for mounting the pressure sensor 1 onto the support substrate 2 include all kinds of members that are normally used in surface mounting, such examples including bumps composed of metal, such as solder and gold, and electro-conductive adhesive.

In the pressure-sensor package described above, the pressure sensor 1 has a silicon/glass composite structure and the support substrate 2 is a silicon/glass composite substrate. Therefore, the thermal expansion coefficient of the pressure sensor 1 and the thermal expansion coefficient of the support substrate 2 have extremely similar values. This prevents deterioration of temperature characteristics of the pressure sensor 1 in response to thermal expansion of the package. Accordingly, in the pressure sensor 1 in which a gap between the support substrate 2 and the diaphragm 15a has a size of about several micrometers, the diaphragm 15a is prevented from being deformed due to thermal expansion, whereby the pressure sensor 1 can accurately perform pressure detection.

As mentioned above, in the pressure-sensor package according to the present invention, the difference in thermal expansion coefficient between the pressure sensor 1 and the support substrate 2 is extremely small. For this reason, there is no limit to the joint members 4 used for mounting the pressure sensor 1 onto the support substrate 2. This significantly increases the options for the bonding techniques.

A method for manufacturing the pressure-sensor package according to the embodiment of the invention will now be described. FIGS. 2A to 2C and FIGS. 3A to 3C are cross-sectional views that illustrate the method for manufacturing the pressure-sensor package according to the embodiment of the invention.

First, a low-resistance silicon substrate 12 is prepared by doping the substrate with impurities. The impurities may either be n-type impurities or p-type impurities. The value of resistance is, for example, about 0.01 Ωcm. The silicon substrate 12 is etched so as to form silicon members (protrusions) 12a and 12b. In this case, the etching may either be dry etching or wet etching. In the case of wet etching, however, it is preferable that anisotropic etching be implemented by defining a crystal face on the surface of the silicon substrate 12 so that there is a difference in the etching rate.

Figure 2A:
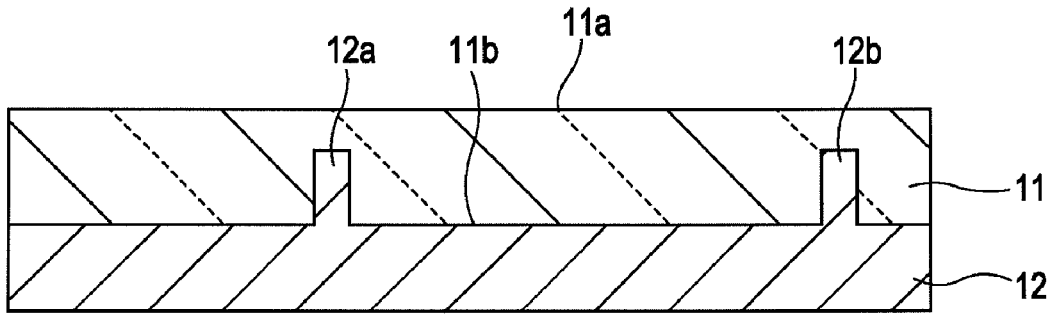
FIGS. 2A to 2C illustrate a method for manufacturing the pressure-sensor package according to the embodiment.

Subsequently, referring to FIG. 2A, a glass substrate 11 is placed on the silicon substrate 12 having the protrusions. The silicon substrate 12 and the glass substrate 11 are then heated, and the silicon substrate 12 is pressed against the glass substrate 11 so that the silicon members 12a and 12b are pressed into the principal surface 11b of the glass substrate 11. As a result, the silicon substrate 12 and the glass substrate 11 become bonded to each other. In this case, it is preferable that the temperature is lower than or equal to the melting point of silicon and is set to a value at which glass is deformable. For example, the heating temperature is set at about 600° C.

Figure 2B:
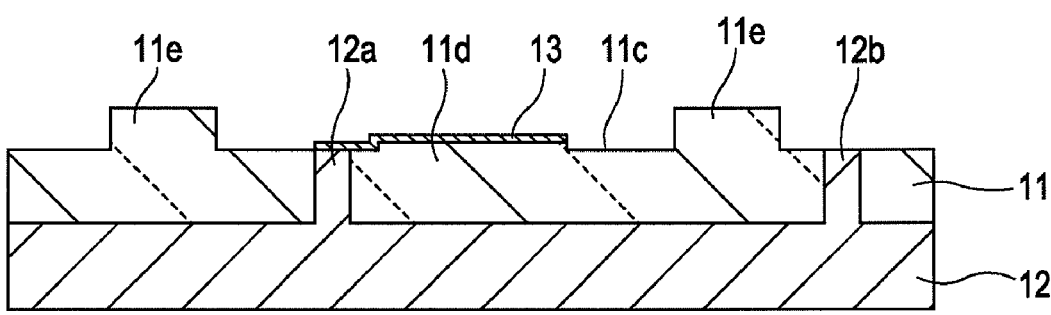

Subsequently, referring to FIG. 2B, the principal surface 11a of the glass substrate 11 is given a milling treatment so as to form a recess 11c and a projection 11d. A fixed electrode 13 is then formed over a region that includes the projection 11d.

Figure 2C:
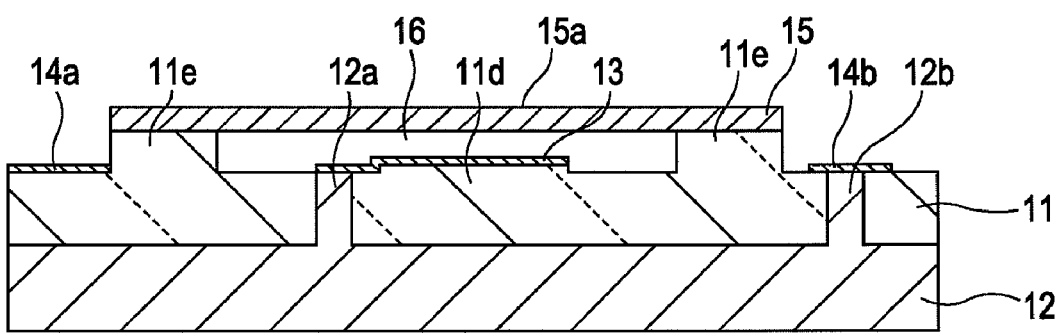

Then, referring to FIG. 2C, a silicon substrate 15 having a diaphragm 15a is bonded to bonding areas 11e on the principal surface 11a of the glass substrate 11 by anode coupling. The anode coupling is implemented by providing electrodes on both the silicon substrate 15 and the glass substrate 11 and applying a voltage of about 300 V to 1 kV thereto under a heating temperature of about 400° C. or lower. Moreover, electrodes 14a and 14b are formed in areas of the glass substrate 11 outside the cavity 16.

Specifically, the fixed electrode 13 and the electrodes 14a and 14b are formed in the following manner. First, electrode-formation regions are coated with an electrode material, and a resist layer is subsequently formed thereon. Then, a patterning process is performed by photolithography so that the resist layer remains in the electrode-formation regions. The electrode material can thus be etched with the resist layer functioning as a mask.

Accordingly, this forms a pressure sensor 1 of a silicon/glass composite structure that includes the glass substrate 11 with the silicon members 12a and 12b embedded therein and having the fixed electrode 13, and the silicon substrate 15 having the diaphragm 15a that is disposed apart from the fixed electrode 13 by a predetermined distance.

Figure 3A:
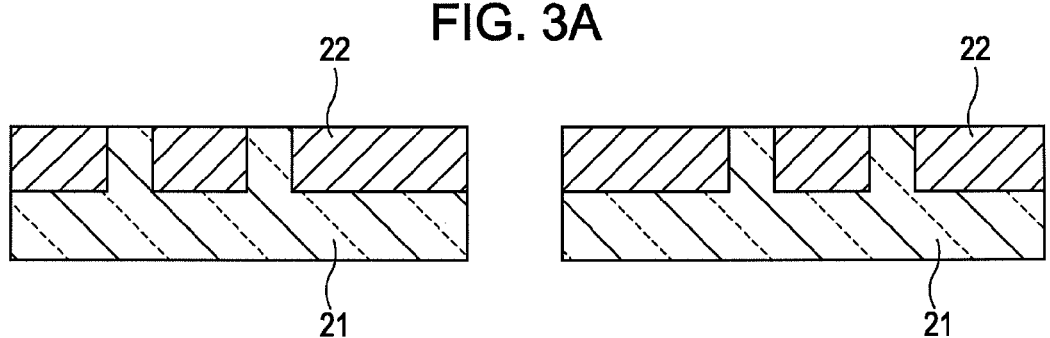
FIGS. 3A to 3C illustrate the method for manufacturing the pressure-sensor package according to the embodiment.
Figure 3B:
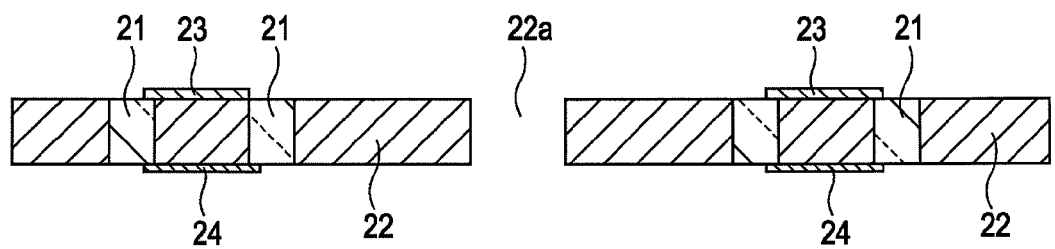

Subsequently, low-resistance silicon substrates are prepared in the same manner as described above. Moreover, the silicon substrates undergo a similar etching process so that silicon members (protrusions) 22 are formed thereon. In a similar manner as above, glass substrates 21 are placed on the silicon substrates having the protrusions. The silicon substrates and the glass substrates 21 are then heated, and the silicon substrates are pressed against the glass substrates 21 so that the silicon members 22 are pressed into one of the principal surfaces of the glass substrates 21. As a result, the silicon substrates and the glass substrates 21 become bonded to each other, as shown in FIG. 3A.

Subsequently, the opposite principal surfaces of the silicon substrates are both given a grinding treatment so that the silicon members 22 become exposed at the opposite principal surfaces. Thus, the silicon members 22 are embedded in the glass substrates 21. Then, in the mounting area, electrodes 23 and 24 are respectively formed on the opposite principal surfaces of each glass substrate 21. Specifically, the electrodes 23 and 24 are formed on each silicon member 22 exposed at the opposite principal surfaces, whereby the electrodes 23 and 24 are electrically connected to the silicon member 22. The electrodes 23 and 24 are formed in the same manner as the fixed electrode 13.

Accordingly, this forms a support substrate 2, which is a silicon/glass composite substrate having the silicon members 22 embedded therein.

Figure 3C:
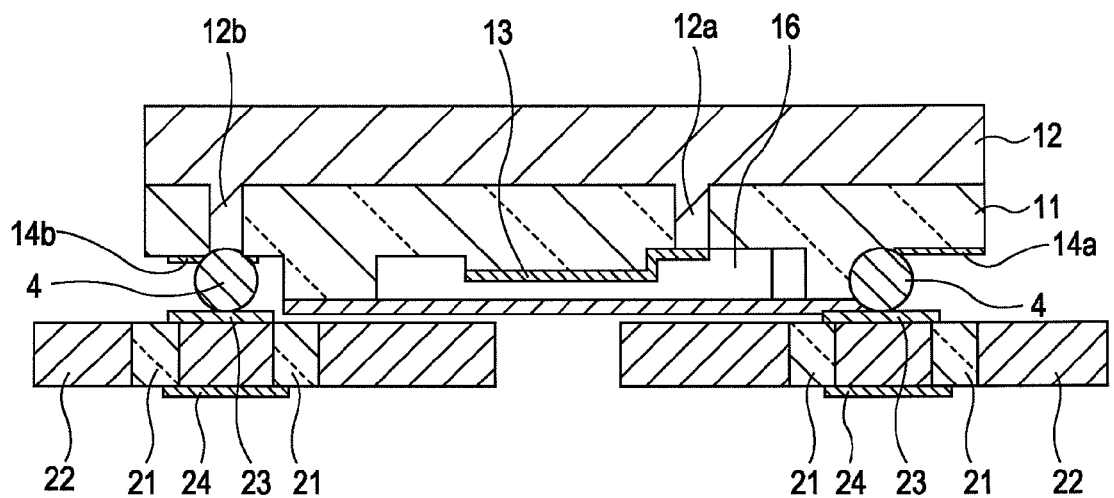

Subsequently, referring to FIG. 3C, the pressure sensor 1 is mounted onto the mounting area of the support substrate 2, namely, onto the electrodes 23. In this case, bumps serving as joint members 4 are first formed on the electrodes 14a and 14b of the pressure sensor 1. The pressure sensor 1 is then mounted onto the support substrate 2, with the bumps being positioned above the electrodes 23 of the support substrate 2. Subsequently, ultraviolet curable resin is poured into the joint section between the pressure sensor 1 and the support substrate 2 and is cured, thereby forming a resin layer 3. As a result, a pressure-sensor package according to the present invention is formed. The technique for mounting the pressure sensor 1 onto the support substrate 2 and the technique for forming the resin layer 3 are not limited to those described above, and may be implemented by means of commonly used techniques.

In the package described above, since the pressure sensor 1 has a silicon/glass composite structure and the support substrate 2 is a silicon/glass composite substrate, the thermal expansion coefficient of the pressure sensor 1 and the thermal expansion coefficient of the support substrate 2 have extremely similar values. This avoids deformation of the diaphragm 15a due to thermal expansion, thereby preventing the diaphragm 15a from being deformed due to factors other than pressure. Consequently, the diaphragm 15a of the pressure sensor 1 becomes deformed only in response to pressure, whereby the pressure sensor 1 can accurately perform pressure detection. In particular, in a typical capacitive pressure sensor in which a gap formed by a micro electro mechanical system (MEMS) is several micrometers or 1 micrometer or less, the pressure sensor becomes incapable of performing pressure detection if the diaphragm becomes deformed due to factors other than pressure. Therefore, the package according to the present invention is especially effective for such pressure sensors. In addition, because the pressure sensor 1 is mounted on the support substrate 2 such that the diaphragm 15a faces the support substrate 2, the silicon substrate 12 having higher rigidity is disposed at the outer side of the pressure sensor 1. Consequently, the silicon substrate 12 serves as an outer frame of the package for the pressure sensor 1, thereby eliminating the need for a cover member and simplifying the structure.

The present embodiment will be described in detail below in order to clarify the advantages of the present invention.

As described above, the package according to the present embodiment shown in FIG. 1 is formed by mounting a pressure sensor having a silicon/glass structure (with a thermal expansion coefficient of approximately 3 ppm/° C.) onto a support substrate, which is a silicon/glass substrate (with a thermal expansion coefficient of approximately 3 ppm/° C.). On the other hand, in a package according to a first comparative example, the support substrate is an alumina substrate (with a thermal expansion coefficient of approximately 7 ppm/° C.) in place of a silicon/glass substrate, and has a pressure sensor of a silicon/glass structure mounted thereon. In a package according to a second comparative example, the support substrate is a glass-epoxy substrate (with a thermal expansion coefficient of approximately 12 ppm/° C.) in place of a silicon/glass substrate, and has a pressure sensor of a silicon/glass structure mounted thereon.

Figure 4:
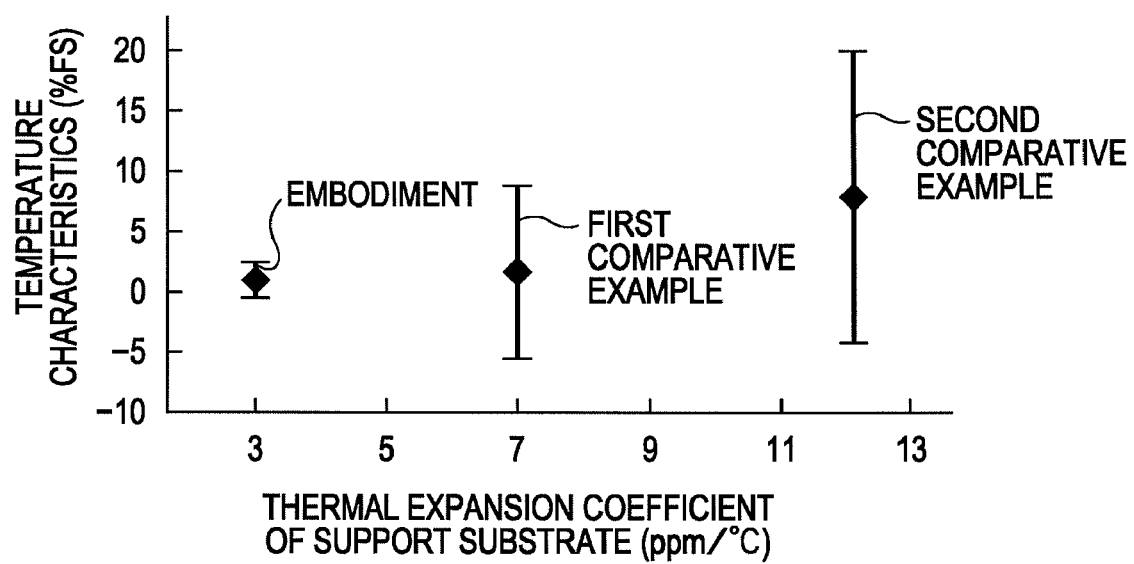
FIG. 4 illustrates temperature characteristics of the pressure sensor contained in the pressure-sensor package according to the embodiment.

FIG. 4 illustrates temperature characteristics obtained from the package according to the present embodiment and the packages according to the first and second comparative examples. The temperature characteristics are obtained by placing packaged samples inside a constant-temperature bath, setting the temperature to a measurement value, and then measuring the capacitance using an inductance-capacitance-resistance (LCR) meter.

As is apparent from FIG. 4, the package according to the present embodiment is hardly affected by thermal expansion since there is substantially no difference in thermal expansion coefficient between the pressure sensor and the support substrate, and therefore exhibits favorable temperature characteristics. In contrast, the packages according to the first and second comparative examples are greatly affected by thermal expansion since there is a large difference in thermal expansion coefficient between the pressure sensor and the support substrate (about 4 ppm/° C. in the first comparative example and about 9 ppm/° C. in the second comparative example). Therefore, the packages according to the first and second comparative examples exhibit unfavorable temperature characteristics.

The present invention is not limited to the above embodiment, and various modifications are permissible. For example, the numerical values and materials mentioned in the above embodiment are not particularly limited. In addition, the process mentioned in the above embodiment is not limited, and may alternatively be performed by changing the order of the steps. Further modifications are permissible without departing from the scope of the invention.

The present invention can be applied to, for example, a pressure-sensor package used for detecting lifting of a head in a hard disk drive.

What is claimed is:

1. A pressure-sensor package comprising:

a pressure sensor including a glass substrate and a silicon substrate, the glass substrate having a silicon conductive member embedded therein and also having a fixed electrode, the silicon substrate having a movable electrode that is disposed apart from the fixed electrode by a predetermined distance; and a support substrate made of a silicon/glass composite, the support substrate having the pressure sensor mounted thereon such that the support substrate and the movable electrode face each other.

2. The pressure-sensor package according to claim 1, further comprising a resin layer that fixes the pressure sensor and the support substrate together.

* * * * *